(12) United States Patent
Nishino et al.

(10) Patent No.: US 9,970,802 B2
(45) Date of Patent: May 15, 2018

(54) THERMAL-TYPE FLOW-RATE SENSOR

(71) Applicant: Murata Manufacturing Co., Ltd., Nagaokakyo-shi, Kyoto-fu (JP)

(72) Inventors: Taro Nishino, Nagaokakyo (JP); Kansho Yamamoto, Nagaokakyo (JP); Katsumi Fujimoto, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 225 days.

(21) Appl. No.: 15/153,977

(22) Filed: May 13, 2016

(65) Prior Publication Data

US 2016/0252382 A1 Sep. 1, 2016

Related U.S. Application Data

(63) Continuation of application No. PCT/JP2014/079482, filed on Nov. 6, 2014.

(30) Foreign Application Priority Data

Nov. 20, 2013 (JP) ................................. 2013-239979

(51) Int. Cl.
| | |
|---|---|
| *G01F 1/68* | (2006.01) |
| *G01F 1/688* | (2006.01) |
| *G01P 5/10* | (2006.01) |
| *G01F 1/684* | (2006.01) |
| *G01F 1/692* | (2006.01) |

(Continued)

(52) U.S. Cl.
CPC .......... *G01F 1/6886* (2013.01); *G01F 1/6845* (2013.01); *G01F 1/69* (2013.01);

(Continued)

(58) Field of Classification Search
CPC .......... G01F 1/68; G01F 1/684; G01F 1/6845; G01F 1/688; G01F 1/6886; G01F 15/14

(Continued)

(56) References Cited

U.S. PATENT DOCUMENTS

| | | | | |
|---|---|---|---|---|
| 4,332,157 A | * | 6/1982 | Zemel | G01F 1/6886 310/306 |
| 4,453,405 A | * | 6/1984 | Zemel | G01P 5/12 310/306 |

(Continued)

FOREIGN PATENT DOCUMENTS

| | | |
|---|---|---|
| JP | 5-07659 B2 | 1/1993 |
| JP | 10-160538 A | 6/1998 |

(Continued)

OTHER PUBLICATIONS

International Search Report for PCT/JP2014/079482, dated Dec. 2, 2014.
Written opinion for PCT/JP2014/079482, dated Dec. 2, 2014.

*Primary Examiner* — Benjamin Schmitt
(74) *Attorney, Agent, or Firm* — Arent Fox LLP (57) ABSTRACT

A thermal-type flow-rate sensor includes a substrate and a detection unit that is supported by the substrate and at least an upper surface of which is exposed to a flow of a fluid. The detection unit includes: an insulating layer, a heating element arranged on an upper surface of the insulating layer, an upstream temperature measurement element that is arranged on the upper surface of the insulating layer upstream of the heating element in the flow direction that includes a pyroelectric layer, and a downstream temperature measurement element arranged on the upper surface of the insulating layer so as to be positioned downstream of the heating element in the flow direction and that includes a pyroelectric layer.

11 Claims, 9 Drawing Sheets

(51) Int. Cl.
*G01F 1/69* (2006.01)
*G01F 15/14* (2006.01)

(52) U.S. Cl.
CPC .............. *G01F 1/692* (2013.01); *G01F 15/14* (2013.01); *G01P 5/10* (2013.01)

(58) Field of Classification Search
USPC ............... 73/204.11, 204.17, 204.22, 204.23
See application file for complete search history.

(56) References Cited

U.S. PATENT DOCUMENTS

| | | | |
|---|---|---|---|
| 6,425,287 B1 * | 7/2002 | Tominaga | G01F 1/6845 73/204.26 |
| 6,662,121 B1 | 12/2003 | Oda et al. | |
| 2003/0190792 A1 | 10/2003 | Aigner et al. | |
| 2005/0087011 A1 | 4/2005 | Vincze et al. | |
| 2010/0139391 A1 | 6/2010 | Sakuma et al. | |
| 2011/0280276 A1 | 11/2011 | Mainguet et al. | |

FOREIGN PATENT DOCUMENTS

| | | |
|---|---|---|
| JP | 2000283813 A | 10/2000 |
| JP | 2004505441 A | 2/2004 |
| JP | 2005531771 A | 10/2005 |
| JP | 406857 B2 | 2/2008 |
| JP | 2010133897 A | 6/2010 |
| JP | 2011237433 A | 11/2011 |
| JP | 2013003066 A | 1/2013 |

* cited by examiner

FIG.16

THERMAL-TYPE FLOW-RATE SENSOR

CROSS REFERENCE

The present application is a continuation of International application No. PCT/JP2014/079482, filed Nov. 6, 2014, which claims priority to Japanese Patent Application No. 2013-239979, filed Nov. 20, 2013, the entire contents of each of which are incorporated herein by reference.

TECHNICAL FIELD

The present invention relates to a thermal-type flow-rate sensor.

BACKGROUND ART

Thermal-type flow-rate sensors such as those described in Japanese Unexamined Patent Application Publication No. 2010-133897 (Patent Document 1) and Japanese Unexamined Patent Application Publication No. 2013-003068 (Patent Document 2) are known.

Figure 13:
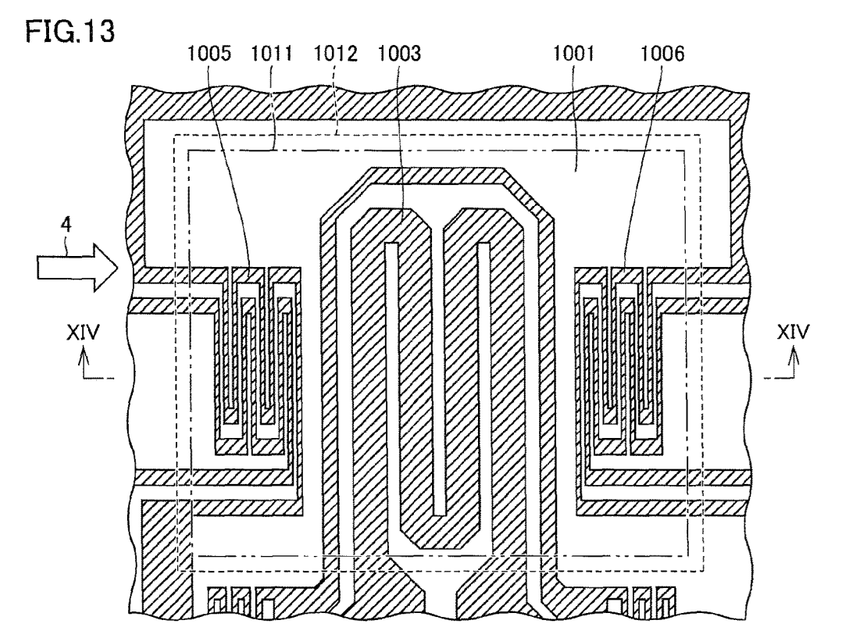
FIG. 13 is a plan view of an important part of a first thermal-type flow-rate sensor of the related art.
Figure 14:
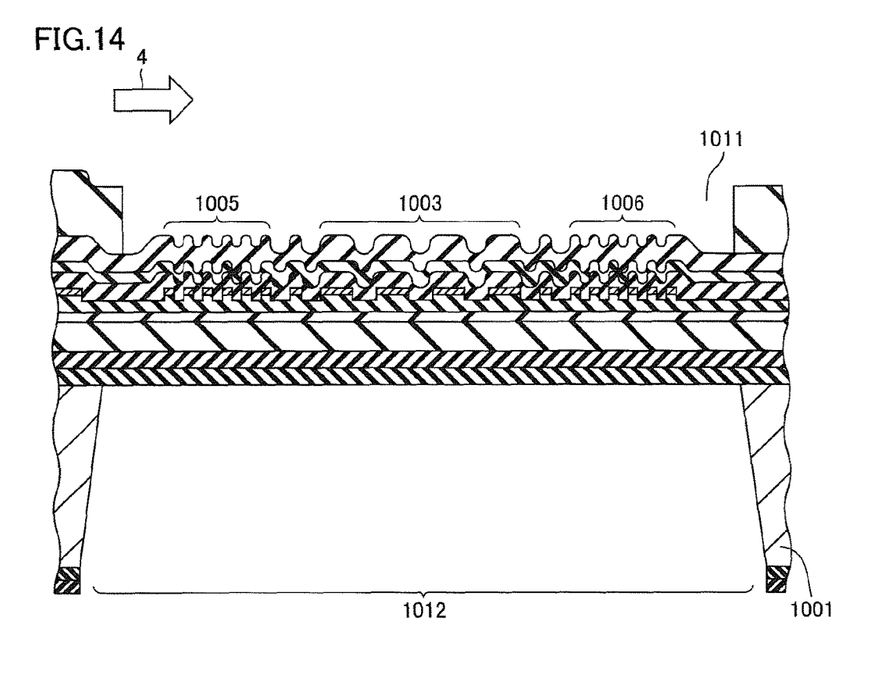
FIG. 14 is a sectional view taken along line XIV-XIV in FIG. 13 and looking in the direction of the arrows.

A plan view of a diaphragm structure, which is an important part of the thermal-type flow-rate sensor described in Patent Document 1, and a region in the vicinity thereof are illustrated in FIG. 13. A sectional view taken along the line XIV-XIV in FIG. 13 and looking in the direction of the arrows is illustrated in FIG. 14. This thermal-type flow-rate sensor is for measuring the flow rate of a flow of a gas in the flow direction 4. A substrate opening 1012 is provided so as to penetrate through a substrate 1001. A protective film opening 1011 is provided in a protective film that covers an upper surface of the substrate 1001. A heating resistor 1003 is arranged in the center of the diaphragm structure, which is provided so as to close off the substrate opening 1012. An upstream temperature-measurement resistor 1005 and a downstream temperature measurement resistor 1006 are arranged on opposite sides of the heating resistor 1003 relative to the flow direction 4.

Figure 15:
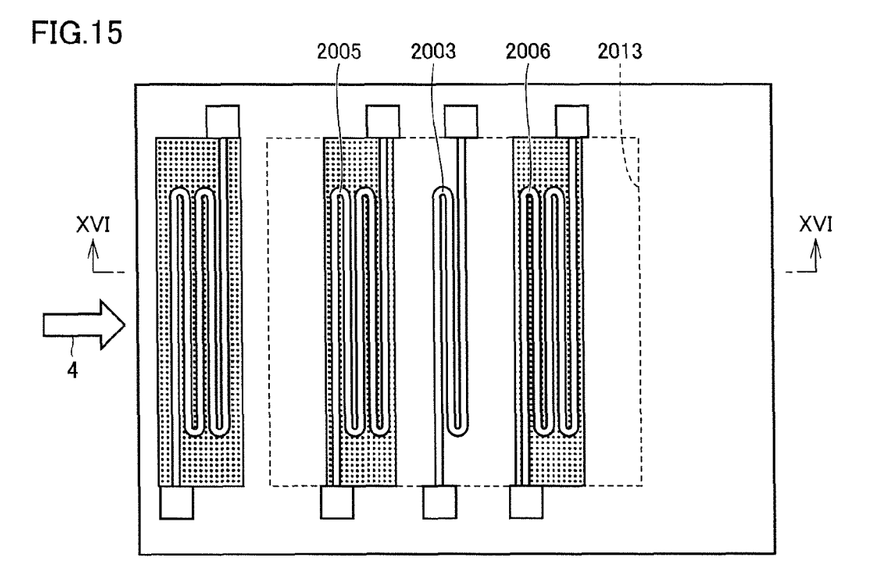
FIG. 15 is a plan view of an important part of a second thermal-type flow-rate sensor of the related art.
Figure 16:
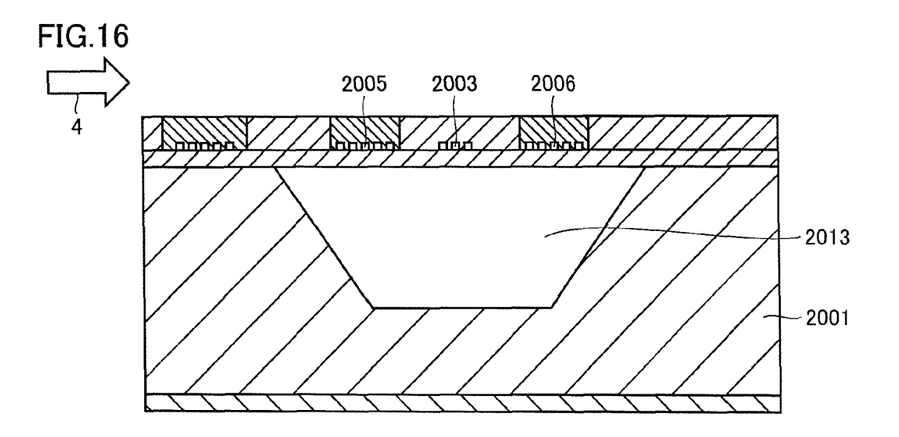
FIG. 16 is a sectional view taken along line XVI-XVI in FIG. 15 and looking in the direction of the arrows.

A plan view of the thermal-type flow-rate sensor described in Patent Document 2 is illustrated in FIG. 15. A sectional view taken along line XVI-XVI in FIG. 15 and looking in the direction of the arrows is illustrated in FIG. 16. This thermal-type flow-rate sensor is for measuring the flow rate of a flow of a gas along the flow direction 4. A cavity 2013 is provided in a substrate 2001 so as to be recessed downward from one surface of the substrate 2001. A heating resistive element 2003, a plate-shaped portion of which is arranged so as to cover the upper side of the cavity 2013, is arranged in the center of the cavity 2013. An upstream temperature-measurement resistive element 2005 and a downstream temperature-measurement resistive element 2006 are arranged in the flow direction 4 with the heating resistive element 2003 interposed therebetween.

As is clear from Patent Documents 1 and 2, a thermal-type flow-rate sensor according to the prior art includes a substrate having an opening therein, an insulating layer provided to cover the opening, a heating element, an upstream temperature measurement element and a downstream temperature measurement element. The heating element is provided on part of the insulating layer that is arranged over the opening in the substrate. The upstream temperature measurement element is provided on part of the insulating layer that is arranged over the opening in the substrate and that is upstream of the heating element in the direction in which the gas (fluid) flows. The downstream temperature measurement element is provided on part of the insulating layer that is arranged above the opening in the substrate and that is downstream of the heating element in the direction in which the gas (fluid) flows. The upstream temperature measurement element and the downstream temperature measurement element are arranged at equal distances from the heating element. The upstream temperature measurement element and the downstream temperature measurement element are composed of the same material as the heating element.

A thermal-type flow-rate sensor according to the prior art causes the heating element to generate heat by supplying an electrical current to the heating element. An electrical current is also supplied to the upstream and downstream temperature measurement elements. When the gas (fluid) is not flowing, the upstream temperature measurement element and the downstream temperature measurement element, which are at equal distances from the heating element, have substantially the same temperatures and their resistance values are the same. On the other hand, when the gas (fluid) flows, the heat generated by the heating element is transmitted to the downstream temperature measurement element via the gas flow and the temperature of the downstream temperature measurement element rises. Consequently, a temperature difference is generated between the upstream temperature measurement element and the downstream temperature measurement element and the resistance value of the upstream temperature measurement element and the resistance value of the downstream temperature measurement element are different. The actual temperature difference can be derived from the difference between the resistance value of the upstream and downstream temperature measurement elements. Since the temperature difference between the upstream and downstream temperature measurement elements is proportional to the square root of the flow speed of the gas, the flow speed of the gas can be obtained from the derived temperature difference.

In the foregoing structures, current needs to be continually supplied to the heating element, the upstream temperature measurement element and the downstream temperature measurement element. Consequently, there is a problem in that power consumption is large.

Accordingly, an object of the present invention is to provide a thermal-type flow-rate sensor that can reduce power consumption.

In order to achieve this object, a thermal-type flow-rate sensor according to one embodiment of the present invention includes a substrate and a detection unit that is supported by the substrate. At least an upper surface of the detection unit is exposed to a flow of a fluid in a flow direction. The detection unit includes an insulating layer, a heating element arranged on an upper surface of the insulating layer, an upstream temperature measurement element arranged on the upper surface of the insulating layer upstream of the heating element in the flow direction, and a downstream temperature measurement element arranged on the upper surface of the insulating layer downstream of the heating element in the flow direction. Both temperature measurement elements include a pyroelectric layer that do not require a current to flow through them to work.

According to the present invention, a thermal-type flow-rate sensor can be realized that can reduce power consumption.

DESCRIPTION OF EMBODIMENTS

The flow rate sensors described in the following embodiments are so-called thermal-type flow-rate sensors and are for measuring the flow rate of a fluid. The fluid, which is the target of measurement here, may be, for example, a gas. However, the fluid is not limited to a gas and may instead be a liquid, for example.

Embodiment 1

Figure 1:
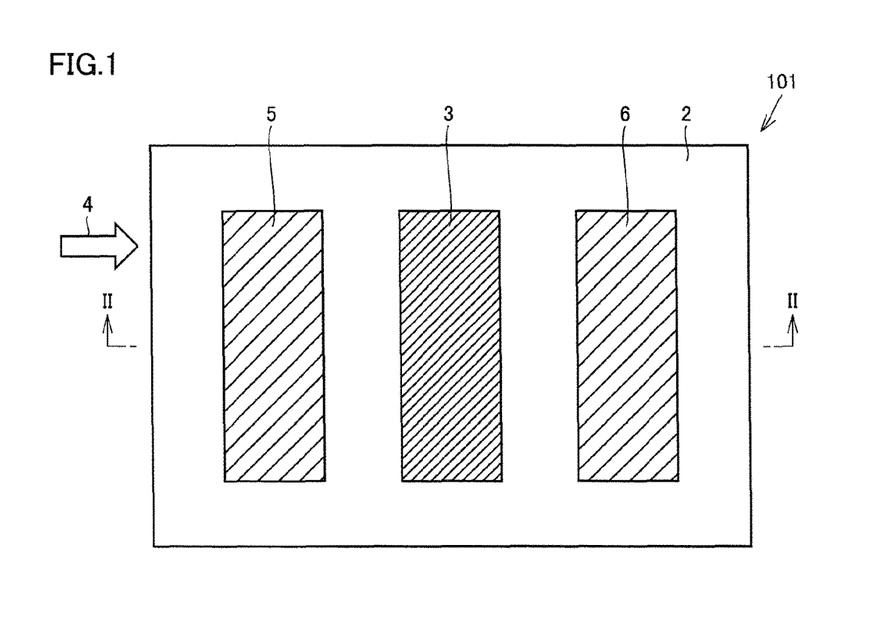
FIG. 1 is a plan view of a thermal-type flow-rate sensor of embodiment 1 of the present invention.
Figure 2:
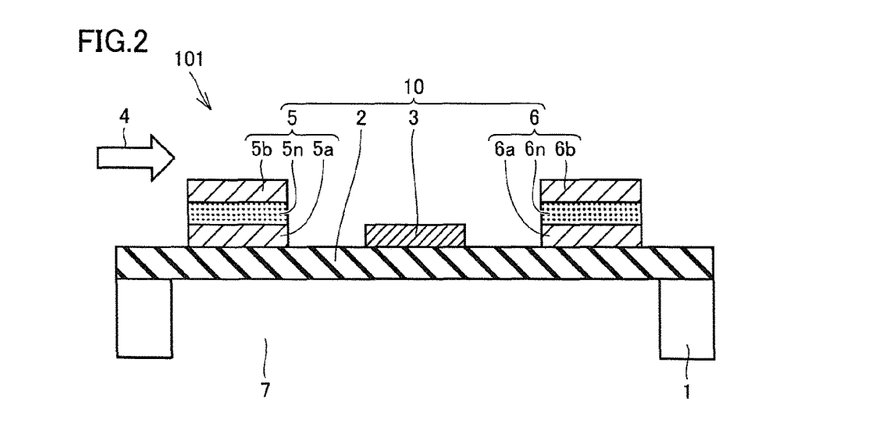
FIG. 2 is a sectional view taken along line II-II in FIG. 1 and looking in the direction of the arrows.

A thermal-type flow-rate sensor of embodiment 1 of the present invention will be described with reference to FIGS. 1 and 2. FIG. 1 illustrates a plan view of the thermal-type flow-rate sensor of this embodiment and FIG. 2 illustrates a sectional view taken along line II-II in FIG. 1 and looking in the direction of the arrows.

A thermal-type flow-rate sensor 101 of this embodiment includes a substrate 1 and a plate-shaped detection unit 10 that is supported by the substrate 1 and at least an upper surface which is exposed to a flow 4 of a fluid. The detection unit 10 includes an insulating layer 2, a heating element 3 arranged on an upper surface of the insulating layer 2, an upstream temperature measurement element 5 that is arranged on the upper surface of the insulating layer 2 so as to be positioned upstream of the heating element 3 relative to the direction of flow 4 and that includes a pyroelectric layer 5n, and a downstream temperature measurement element 6 that is arranged on the upper surface of the insulating layer 2 so as to be positioned downstream of the heating element 3 relative to the direction of flow 4 and that includes a pyroelectric layer 6n.

In the thermal-type flow-rate sensor 101 of this embodiment, the substrate 1 has a shape that exists only in a limited rectangular region similarly to the insulating layer 2. However, the substrate 1 and the insulating layer 2 may extend more widely to the outside without being limited to the inside of this rectangular region.

The substrate 1 has an opening 7. As illustrated in FIG. 2, the opening 7 penetrates through the substrate 1. It is preferred that the space underneath the insulating layer 2 in the region where the heating element 3, the upstream temperature measurement element 5 and the downstream temperature measurement element 6 of the detection unit 10 are arranged, be hollow. However, opening 7 does not need to penetrate through the substrate 1 and instead be a recess provided in the substrate 1. The substrate 1 is preferably composed of, for example, single crystal Si. The opening 7 may be formed by wet or dry etching.

The insulating layer 2 is preferably formed of at least either of $SiO_2$ and SiN. For example, the insulating layer 2 may be a multilayer body formed by stacking layers of $SiO_2$ and SiN on top of one another.

The heating element 3 is preferably composed of a metal such as Mo or Pt, a metal nitride compound, a metal silicide compound or polycrystaline Si and is provided on a part of the insulating layer 2 that is located above the opening 7. As illustrated in FIG. 1, the heating element 3 has a rectangular shape in plan view in this embodiment, but the heating element 3 is not limited to this shape and may have other shapes, for example a meandering shape.

The upstream temperature measurement element 5 is provided upstream of the heating element 3 in the direction in which the fluid flows, that is, in the direction of the flow 4 of the fluid and on part of the insulating layer 2 that is located above the opening 7. The downstream temperature measurement element 6 is provided downstream of the heating element 3 in the direction of fluid flow and on a part of the insulating layer 2 that is located above the opening 7.

The upstream temperature measurement element 5 includes a lower electrode 5a and an upper electrode 5b, sandwiching the pyroelectric layer 5n. The downstream temperature measurement element 6 includes a lower electrode 6a and an upper electrode 6b sandwiching the pyroelectric layer 6n. The lower electrodes 5a and 6a and the upper electrodes 5b and 6b are composed of a metal such as Mo or Pt. The lower electrodes 5a and 6a and the upper electrodes 5b and 6b may be, for example, multilayer bodies formed by stacking a plurality of metal layers one on top of the other. The pyroelectric layers 5n and 6n are preferably composed of a pyroelectric material such as aluminum nitride (AlN). A pyroelectric effect is produced by a change in the temperature of the pyroelectric material. That is, the polarization of the pyroelectric material changes as a function of the change in temperature. Since the amount of surface charge changes when the polarization changes, this change can be detected as a potential difference between two electrodes (e.g., between lower electrode 5a and upper electrode 5b or between lower electrode 6a and upper electrode 6b). The upstream temperature measurement element 5 and the downstream temperature measurement element 6 can each detect a change in temperature as a potential difference and therefore may be called pyroelectric elements.

An electric current intermittently flows in the heating element 3. A potential difference generated between the two electrodes (between lower electrode 5a and upper electrode 5b or between lower electrode 6a and upper electrode 6b) in each of the upstream temperature measurement element 5 and the downstream temperature measurement element 6 is measured.

In the thermal-type flow-rate sensor 101 of this embodiment, the heating element 3 generates heat due to a current intermittently flowing in the heating element 3. In this state, the temperatures of the upstream temperature measurement element 5 and the downstream temperature measurement element 6, which are at equal distances from the heating element 3, are substantially the same when the fluid is not flowing and the outputs of the upstream temperature measurement element 5 and the downstream temperature measurement element 6 are equal to each other. On the other hand, when the fluid flows, the heat generated by the heating element 3 is transmitted to the downstream temperature measurement element 6 along the flow direction 4 of the fluid and the temperature of the downstream temperature measurement element 6 rises. Therefore, a temperature difference is generated between the upstream temperature measurement element 5 and the downstream temperature measurement element 6. This temperature difference is proportional to the square root of the flow speed of the fluid and therefore the flow speed of the fluid can be obtained by detecting this temperature difference. Specifically, the flow speed of the fluid can be obtained from the difference between the outputs of the upstream temperature measurement element 5 and the downstream temperature measurement element 6. The term "difference between the outputs" used here means the difference between the potential difference obtained from the upstream temperature measurement element 5 and the potential difference obtained from the downstream temperature measurement element 6, for example. The flow speed of the fluid can be obtained from the difference between the output value of the upstream temperature measurement element 5 and the output value of the downstream temperature measurement element 6. The flow speed of the fluid can also be obtained from the time difference between the output of the upstream temperature measurement element 5 and the output of the downstream temperature measurement element 6.

In this embodiment, since it is sufficient to intermittently supply a current to only the heating element 3 and a current does not need to be supplied to the upstream temperature measurement element 5 and the downstream temperature measurement element 6, which include the pyroelectric layers 5n and 6n, power consumption can be reduced.

In this embodiment, the upstream temperature measurement element 5 and the downstream temperature measurement element 6 are pyroelectric elements and utilize the pyroelectric effect. Consequently, the outputs of these elements indicate a change in temperature rather than the temperature itself and are therefore not liable to be affected by the surrounding environment. According to this embodiment, a thermal-type flow-rate sensor that is, for example, not likely to be affected by the temperature of the surroundings and has excellent temperature characteristics can be realized.

As described in this embodiment, it is preferable that the pyroelectric layers 5n and 6n, respectively, included in the upstream temperature measurement element 5 and the downstream temperature measurement element 6 be formed of a pyroelectric material having AlN as the main constituent of the material. When a pyroelectric material having AlN as the main constituent of the material is used, there is high thermal uniformity in the upstream temperature measurement element 5 and the downstream temperature measurement element 6 due to the high thermal conductivity of AlN and stable outputs can be obtained.

The pyroelectric material used in the pyroelectric layers 5n and 6n is not limited to AlN itself and may be an AlN-based material so long as AlN is the main constituent of the material. The term "AlN-based material" used here includes materials obtained by doping AlN with Sc or the like. Furthermore, a lead zirconate titanate (PZT)-based material, a potassium sodium niobate (KNN)-based material or a ZnO-based material can also be used as the pyroelectric material. Among these materials, AlN-based materials do not need to undergo a poling treatment, have an insulating property and have high thermal conductivity and therefore are advantageous for carrying out the present invention. In addition, AlN-based materials have are recognized as having a high phase transition temperature of 2000° C. or more and exhibiting piezoelectricity even at 1000° C. or more and therefore can be used at higher temperatures than lead zirconate titanate (PZT)-based materials, potassium sodium niobate (KNN)-based materials and ZnO-based materials.

Furthermore, in this embodiment, it is possible to increase the number of times that measurement is performed per unit time by shortening the period in which a current flows in the heating element 3. In this way, the measurement accuracy can be increased as needed.

In this embodiment, since the upstream temperature measurement element 5 and the downstream temperature measurement element 6 are pyroelectric elements, the accuracy with which the flow rate can be measured is improved by not only focusing on the output values obtained from the upstream and downstream temperature measurement elements 5 and 6 but by also focusing on the difference between the output values of the upstream and downstream temperature measurement elements 5 and 6 and focusing on the time difference between the outputs.

As described in this embodiment, it is preferable that the upstream temperature measurement element 5 and the downstream temperature measurement element 6, respectively, include the pyroelectric layers 5n and 6n, the upper electrodes 5b and 6b provided above the pyroelectric layers 5n and 6n and the lower electrodes 5a and 6a provided below the pyroelectric layers 5n and 6n. When a pyroelectric layer is sandwiched between two electrodes in the thickness direction in this manner, that is, when a so-called sandwich structure is adopted, it is easy and convenient to detect the potential difference between the two electrodes (between lower electrode 5a and upper electrode 5b on the one hand or between lower electrode 6a and upper electrode 6b on the other) generated due to the pyroelectric effect.

Embodiment 2

Figure 3:
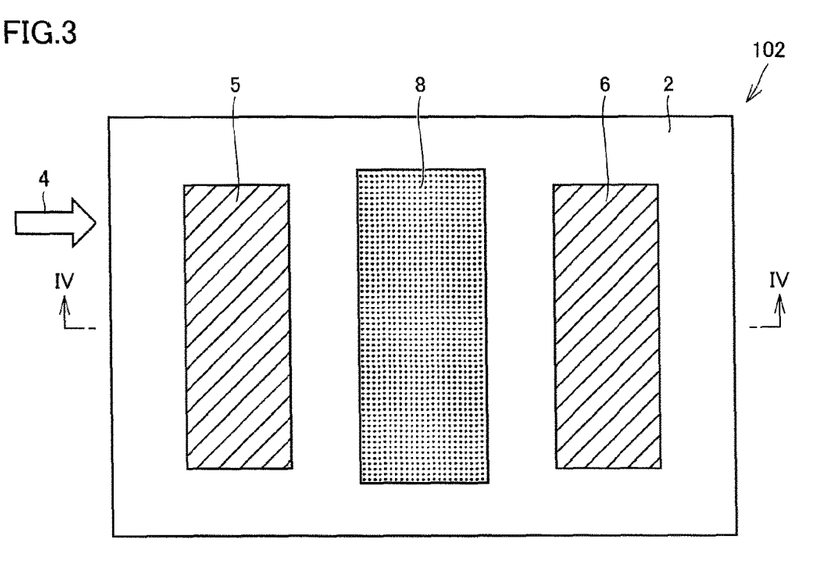
FIG. 3 is a plan view of a thermal-type flow-rate sensor of embodiment 2 of the present invention.
Figure 4:
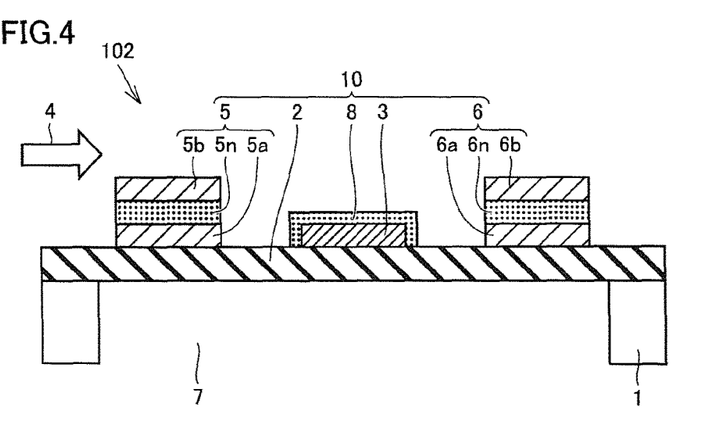
FIG. 4 is a sectional view taken along line IV-IV in FIG. 3 and looking in the direction of the arrows.

A thermal-type flow-rate sensor of embodiment 2 of the present invention will be described with reference to FIGS. 3 and 4. FIG. 3 illustrates a plan view of the thermal-type flow-rate sensor of this embodiment and FIG. 4 illustrates a sectional view taken along line IV-IV in FIG. 3 and looking in the direction of the arrows. A thermal-type flow-rate sensor 102 of this embodiment has the same basic configuration as the thermal-type flow-rate sensor 101 described in embodiment 1, but differs in the following way.

A detection unit 10 of the thermal-type flow-rate sensor 102 includes a protective film 8 that covers the heating element 3. It is preferable that the protective film 8 be composed of AlN, for example. In addition, the protective film 8 may be composed of the same material as the pyroelectric layers 5n and 6n of the upstream temperature measurement element 5 and the downstream temperature measurement element 6.

The same effects as described in embodiment 1 can be obtained in this embodiment. In addition, in this embodiment, the heating element 3 is covered by the protective film 8 and as a result its reliability can be improved. When the protective film 8 is composed of AlN, the temperature of the heating element 3 can be made more uniform since the thermal conductivity of AlN is high. As a result, a stable output can be obtained in the downstream temperature measurement element 6.

Embodiment 3

Figure 5:
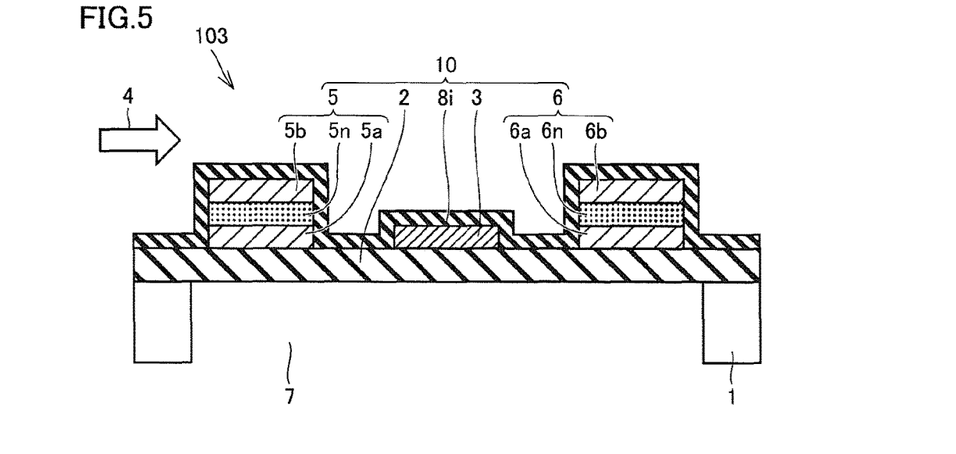
FIG. 5 is a sectional view of a thermal-type flow-rate sensor of embodiment 3 of the present invention.

A thermal-type flow-rate sensor of embodiment 3 of the present invention will be described with reference to FIG. 5. FIG. 5 illustrates a sectional view of the thermal-type flow-rate sensor of this embodiment. A thermal-type flow-rate sensor 103 of this embodiment has the same basic configuration as the thermal-type flow-rate sensor 102 described in embodiment 2, but differs in the following way.

The thermal-type flow-rate sensor 103 includes a protective film 8i instead of the protective film 8 described in embodiment 2. The protective film 8i covers the heating element 3, the upstream temperature measurement element 5 and the downstream temperature measurement element 6 and is preferably composed of any of AlN, SiO2 and SiN, for example.

The same effects as described in embodiment 2 can be obtained in this embodiment. In addition, since both the heating element 3 and the upstream and downstream temperature measurement elements 5 and 6 are covered by the protective film 8i, the reliability of the sensor can be improved.

Embodiment 4

Figure 6:
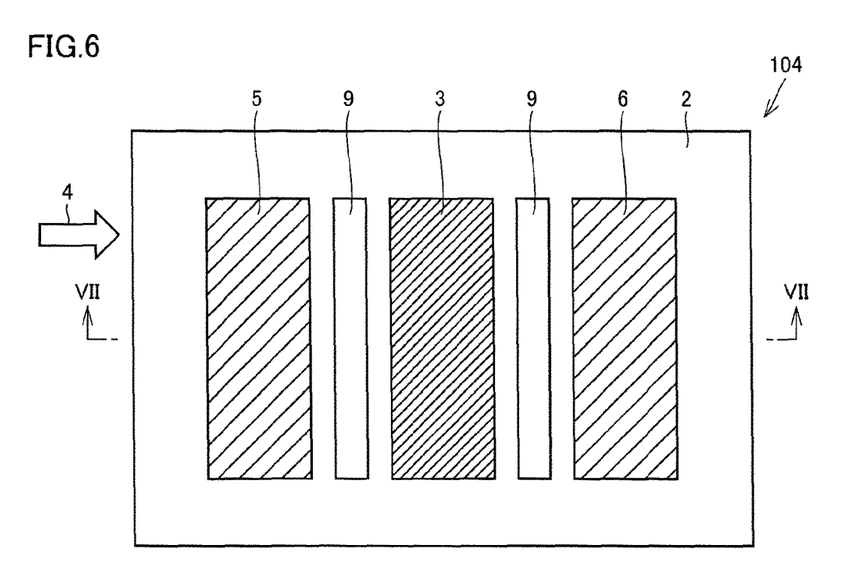
FIG. 6 is a plan view of a thermal-type flow-rate sensor of embodiment 4 of the present invention.
Figure 7:
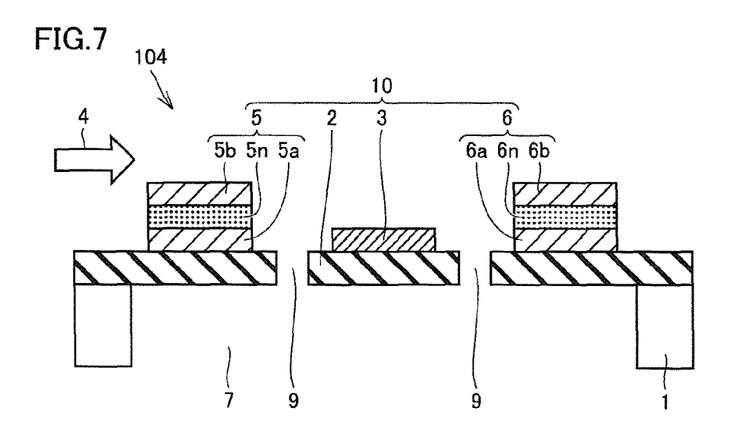
FIG. 7 is a sectional view taken along line VII-VII in FIG. 6 and looking in the direction of arrows.

A thermal-type flow-rate sensor of embodiment 4 of the present invention will be described with reference to FIGS. 6 and 7. FIG. 6 illustrates a plan view of the thermal-type flow-rate sensor of this embodiment and FIG. 7 illustrates a sectional view taken along line VII-VII in FIG. 6 and looking in the direction of the arrows. A thermal-type flow-rate sensor 104 of this embodiment has the same basic configuration as the thermal-type flow-rate sensor 101 described in embodiment 1, but differs in the following way.

In the thermal-type flow-rate sensor 104, the insulating layer 2 has one or more slits 9. In a preferred embodiment, they are between the upstream temperature measurement element 5 and the heating element 3 and between the heating element 3 and the downstream temperature measurement element 6, respectively. The thermal-type flow-rate sensor 104 may also include the protective film 8 described in embodiment 2 or the protective film 8i described in embodiment 3.

The same effects as described in embodiment 1 can be obtained in this embodiment as well. In addition, in this embodiment, heat transmitted from the heating element 3 to the temperature measurement elements via the insulating layer 2 can be reduced due to the presence of the slits 9. Therefore, the proportion of heat transmitted from the heating element 3 to the temperature measurement elements by the fluid which is the target of measurement can be made relatively large. As a result, high sensitivity of the sensor can be realized.

Embodiment 5

Figure 8:
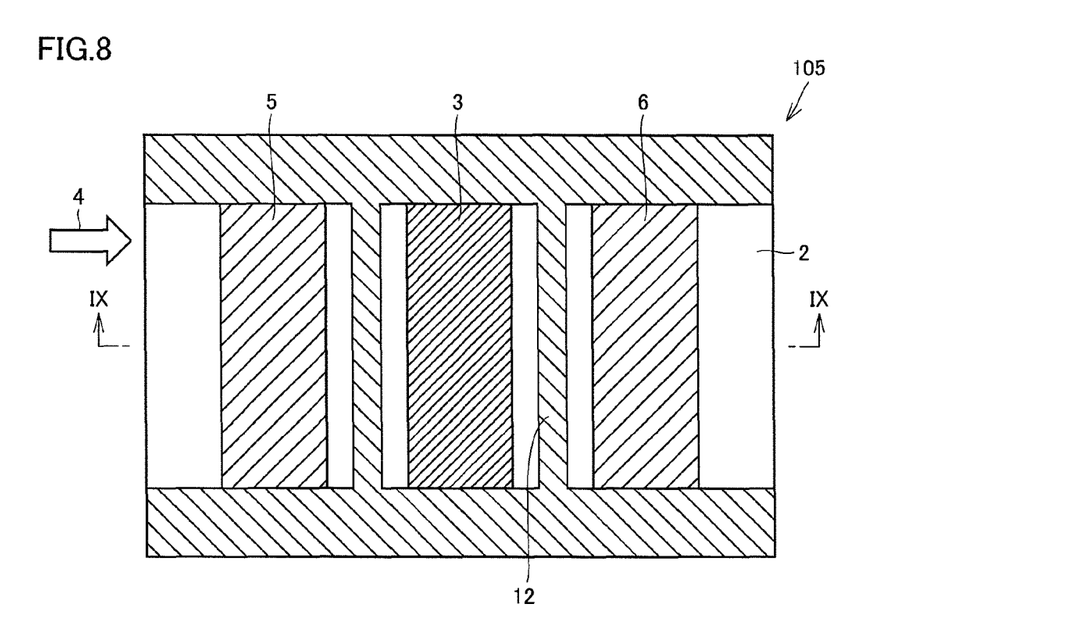
FIG. 8 is a plan view of a thermal-type flow-rate sensor of embodiment 5 of the present invention.
Figure 9:
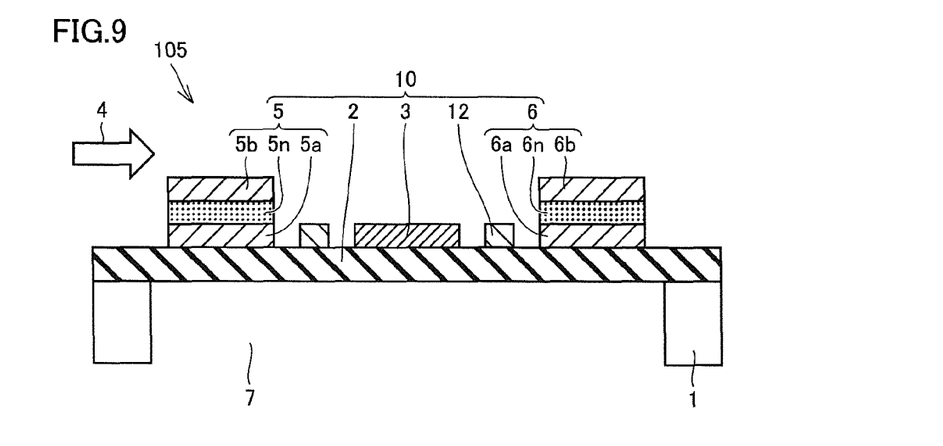
FIG. 9 is a sectional view taken along line IX-IX in FIG. 8 and looking in the direction of the arrows.

A thermal-type flow-rate sensor of embodiment 5 of the present invention will be described with reference to FIGS. 8 and 9. FIG. 8 illustrates a plan view of the thermal-type flow-rate sensor of this embodiment and FIG. 9 illustrates a sectional view taken along line IX-IX in FIG. 8 and looking in the direction of the arrows. A thermal-type flow-rate sensor 105 of this embodiment has the same basic configuration as the thermal-type flow-rate sensor 101 described in embodiment 1, but differs in the following way.

In the thermal-type flow-rate sensor 105, the detection unit 10 includes a heat sink 12 located between the upstream temperature measurement element 5 and the heating element 3 and/or between the heating element 3 and the downstream temperature measurement element 6. The thermal-type flow-rate sensor 105 may include the protective film 8 described in embodiment 2 or the protective film 8i described in embodiment 3.

The same effects as described in embodiment 1 can be obtained in this embodiment as well. In addition, in this embodiment, the transmission of heat from the heating element 3 to the temperature measurement elements via the insulating layer 2 is hindered due to the presence of the heat sinks 12 and most of the heat can be released to the outside. Therefore, the proportion of heat transmitted from the heating element 3 to the temperature measurement elements by the fluid, which is the target of measurement, can be made relatively large. As a result, high sensitivity can be realized.

For example, aluminum nitride (AlN), boron nitride (BN) or a metal can be used as the material of the heat sinks 12. However, since there is a higher degree of freedom in design when an insulating material is used as the material of the heat sinks 12 compared with when a conductor such as a metal is used, it is preferable to use an insulating material.

Embodiment 6

Figure 10:
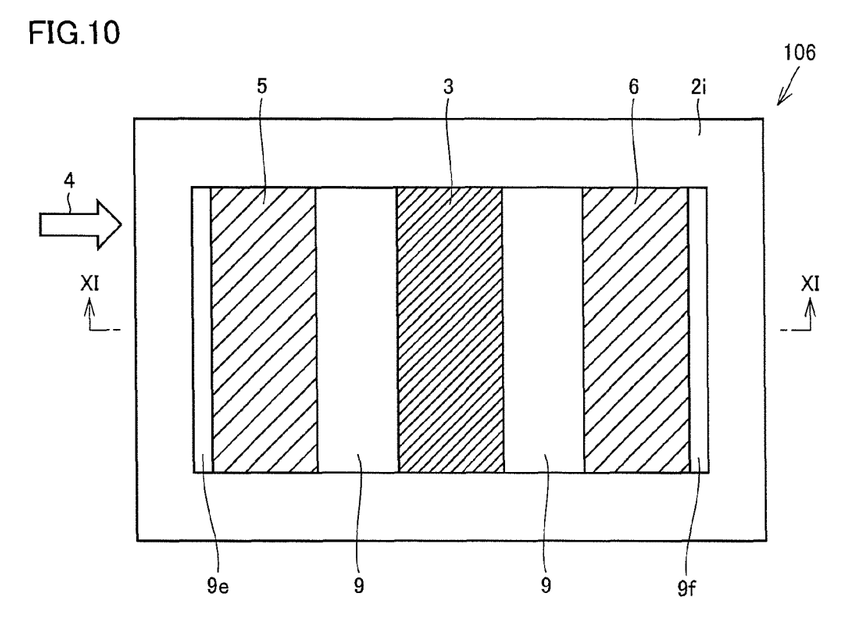
FIG. 10 is a plan view of a thermal-type flow-rate sensor of embodiment 6 of the present invention.
Figure 11:
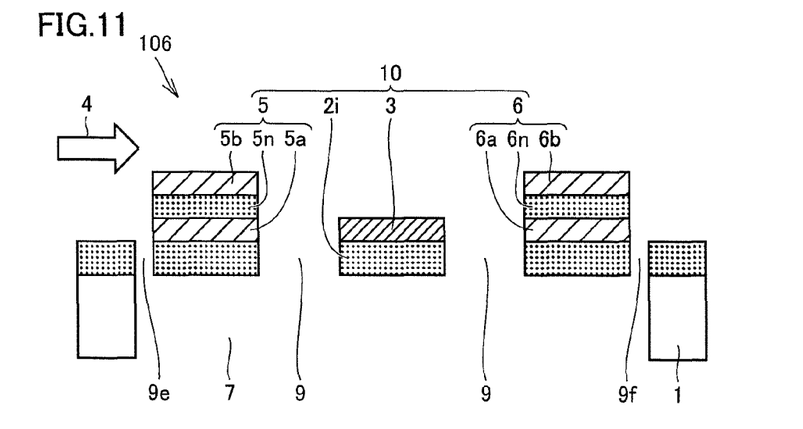
FIG. 11 is a sectional view taken along line XI-XI in FIG. 10 and looking in the direction of the arrows.

A thermal-type flow-rate sensor of embodiment 6 of the present invention will be described with reference to FIGS. 10 and 11. FIG. 10 illustrates a plan view of the thermal-type flow-rate sensor of this embodiment and FIG. 11 illustrates a sectional view taken along line XI-XI in FIG. 10 and looking in the direction of the arrows. A thermal-type flow-rate sensor 106 of this embodiment has the same basic configuration as the thermal-type flow-rate sensor 101 described in embodiment 1, but differs in the following way.

The thermal-type flow-rate sensor 106 includes an insulating layer 2i instead of the insulating layer 2 described in the preceding embodiments. The insulating layer 2i of the thermal-type flow-rate sensor 106 has AlN as a main constituent material. In addition, in the thermal-type flow-rate sensor 106, respective slits 9 are provided between the upstream temperature measurement element 5 and the heating element 3 on the one hand and between the heating element 3 and the downstream temperature measurement element 6 on the other. In the thermal-type flow-rate sensor 106, a slit 9e is provided on the side of the upstream temperature measurement element 5 that is opposite to the side where the heating element 3 is, and a slit 9f is provided on the side of the downstream temperature measurement element 6 that is opposite to the side where the heating element 3 is. The thermal-type flow-rate sensor 106 may include the protective film 8 described in embodiment 2 or the protective film 8i described in embodiment 3.

The same effects as described in embodiment 1 can be obtained in this embodiment as well. In addition, in this embodiment, since the insulating layer 2i has AlN as a main constituent material and AlN has high thermal conductivity, the thermal responsivity can be improved. That is, the frequency of the power used to heat the heating element 3 can be increased and a thermal-type flow-rate sensor having a fast response can be realized. Thus, since the time required to take a measurement can be reduced, the time for which power is applied to the heating element 3 becomes shorter and power consumption can be reduced.

The slits 9, 9e and 9f described in this embodiment are not essential, but it is preferable that they be provided. In particular, in the case where the main constituent material of the insulating layer 2i is AlN as in this embodiment, not only is there rapid transmission and radiation of heat that is required to take a measurement, but there is also unwanted rapid transmission of heat from the heating element 3 to the temperature measurement elements via the insulating layer 2i. In order to suppress the unwanted transmission of heat from the heating element 3 to the temperature measurement elements via the insulating layer 2i, it is effective to adopt a configuration incorporating slits in such a way. In addition, the heat sinks 12 described in embodiment 5 may be provided instead of the slits 9, 9e and 9f.

Embodiment 7

Figure 12:
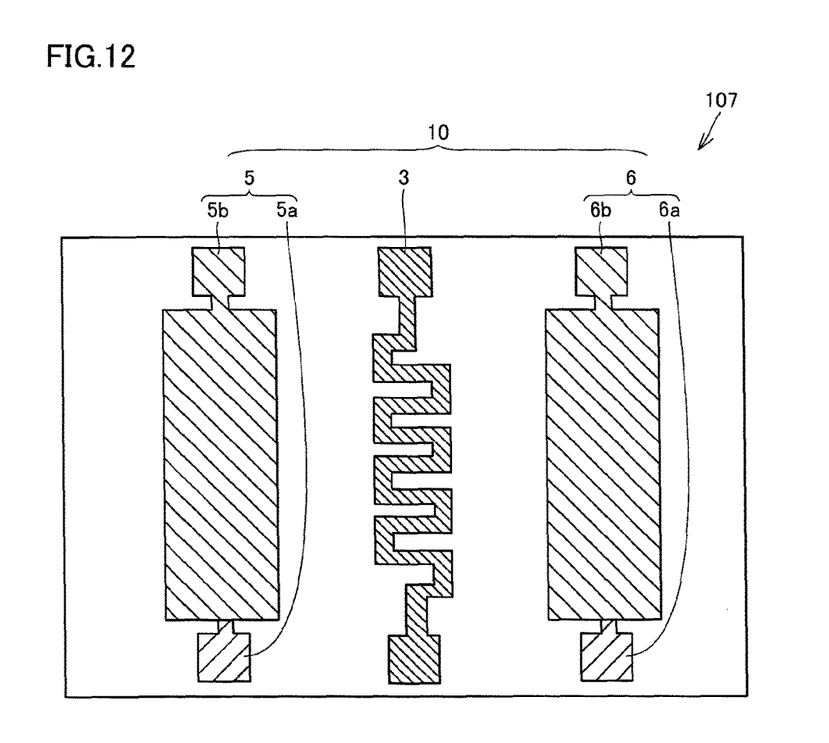
FIG. 12 is a plan view of a thermal-type flow-rate sensor of embodiment 7 of the present invention.

A thermal-type flow-rate sensor of embodiment 7 of the present invention will be described with reference to FIG. 12. FIG. 12 illustrates a plan view of the thermal-type flow-rate sensor of this embodiment. A thermal-type flow-rate sensor 107 of this embodiment has the same basic configuration as the thermal-type flow-rate sensor 101 described in embodiment 1, but differs in the following way.

The shapes of the heating element 3, the lower electrodes 5a and 6a and the upper electrodes 5b and 6b in the thermal-type flow-rate sensor 107 are different from those in the thermal-type flow-rate sensor 101. Specifically, the heating element 3, the lower electrodes 5a and 6a and the upper electrodes 5b and 6b each have a shape that includes an external-connection pad. In addition, the heating element 3 has a meandering shape as illustrated in FIG. 12. The thermal-type flow-rate sensor 107 may include the protective film 8 described in embodiment 2 or the protective film 8i described in embodiment 3. Furthermore, the thermal-type flow-rate sensor 107 may include the slits 9, 9e and 9f described in embodiment 4 and embodiment 6. The thermal-type flow-rate sensor 107 may include the heat sinks 12 described in embodiment 5. The thermal-type flow-rate sensor 107 may include the insulating layer 2i having AlN as a main consistent material described in embodiment 6 instead of the insulating layer 2.

The same effects as described in embodiment 1 can be obtained in this embodiment as well. In addition, in this embodiment, since the heating element 3, the lower electrodes 5a and 6a and the upper electrodes 5b and 6b have shapes that include an external-connection electrode pad, electrical connections to the outside can be made easily. Furthermore, since the heating element 3 has a meandering shape in this embodiment, the heating efficiency of the heating element 3 can be increased.

In addition, the presently disclosed embodiments are illustrative in all points and are not limiting. The scope of the present invention is not to be defined by the above description but rather by the scope of the claims, and equivalents to the scope of the claims and all modifications within the scope of the claims are to be included within the scope of the present invention.

INDUSTRIAL APPLICABILITY

The present invention can be used in a thermal-type flow-rate sensor.

The invention claimed is:

1. A thermal-type flow-rate sensor comprising:
   a substrate; and
   a detection unit supported by the substrate and having an upper surface adapted to be exposed to a flow of a fluid in a flow direction;
   the detection unit including:
      an insulating layer,
      a heating element arranged on an upper surface of the insulating layer;
      an upstream temperature measurement element arranged on the upper surface of the insulating layer upstream of the heating element relative to the flow direction, the upstream temperature measurement element including a pyroelectric layer, and
      a downstream temperature measurement element arranged on the upper surface of the insulating layer so as to be positioned downstream of the heating element relative to the flow direction, the downstream temperature measurement element including a pyroelectric layer.

2. The thermal-type flow-rate sensor according to claim 1, wherein the pyroelectric layers have AlN as a main constituent material.

3. The thermal-type flow-rate sensor according to claim 1, wherein the pyroelectric layers of the upstream and downstream temperature measurement elements are sandwiched between upper and lower respective electrodes.

4. The thermal-type flow-rate sensor according to claim 1, wherein the detection unit includes a protective film that covers the heating element.

5. The thermal-type flow-rate sensor according to claim 4, wherein the protective film also covers the upstream and downstream temperature measurement elements.

6. The thermal-type flow-rate sensor according to claim 1, wherein the insulating layer has a slit located between the upstream temperature measurement element and the heating element or between the heating element and the downstream temperature measurement element.

7. The thermal-type flow-rate sensor according to claim 1, wherein the insulating layer has respective slits located between the upstream temperature measurement element and the heating element on the one hand and between the heating element and the downstream temperature measurement element in the other.

8. The thermal-type flow-rate sensor according to claim 1, wherein the detection unit includes a heat sink between either the upstream temperature measurement element and the heating element on the one hand and between the heating element and the downstream temperature measurement element on the other.

9. The thermal-type flow-rate sensor according to claim 1, wherein the detection unit includes respective heat sinks located between the upstream temperature measurement element and the heating element on the one hand and between the heating element and the downstream temperature element on the other.

10. The thermal-type flow-rate sensor according to claim 1, wherein the insulating layer has AlN as a main constituent material.

11. The thermal-type flow-rate sensor according to claim 1, wherein the heating element has a meandering shape.

* * * * *